April 1, 1924.
W. HEYNE
SLIDING CALIPER
Filed Aug. 16, 1922    5 Sheets-Sheet 1
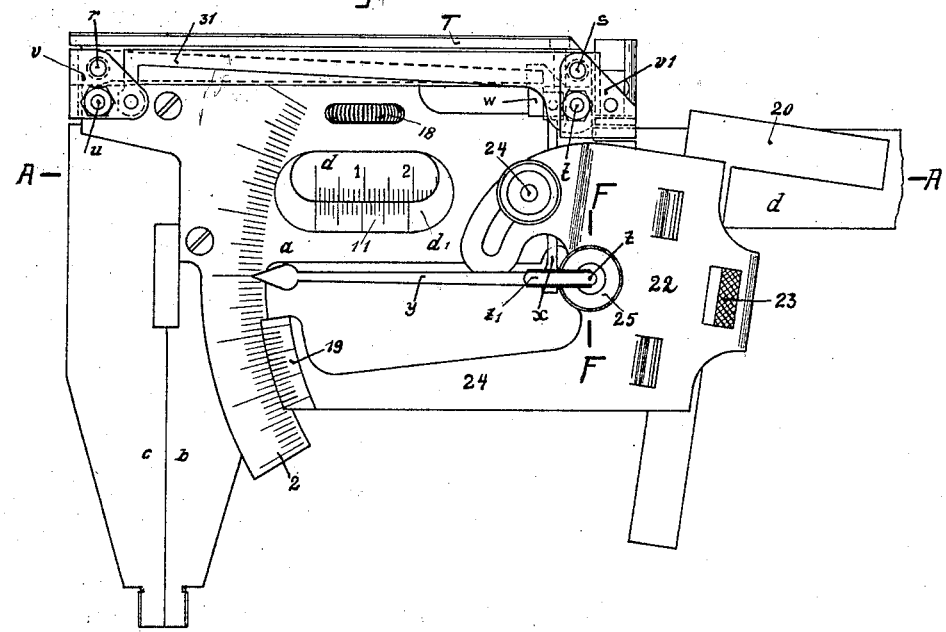
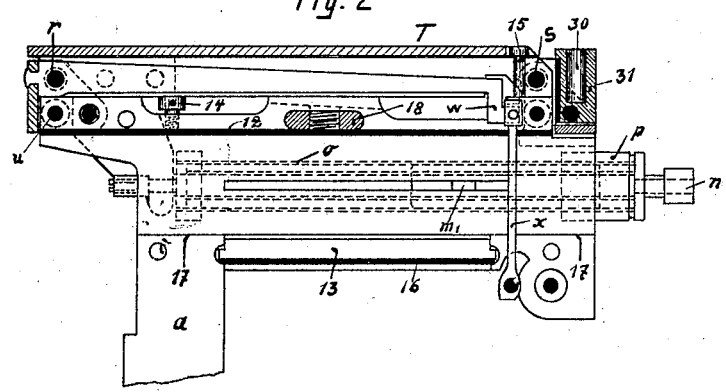
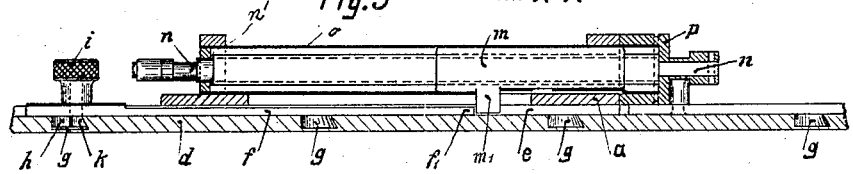
INVENTOR:
Willy Heyne
Wm Wallace White
ATTY

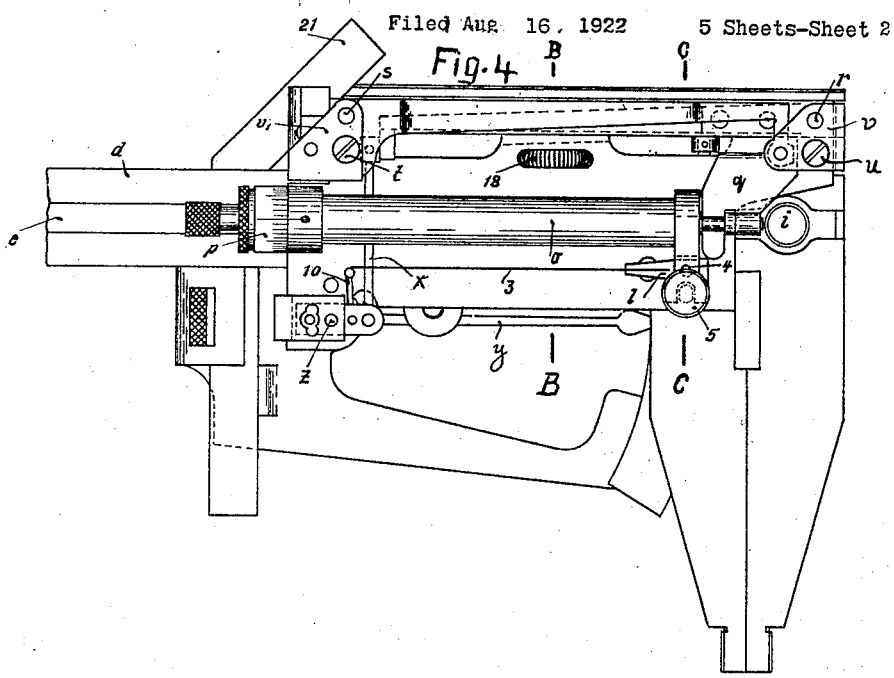
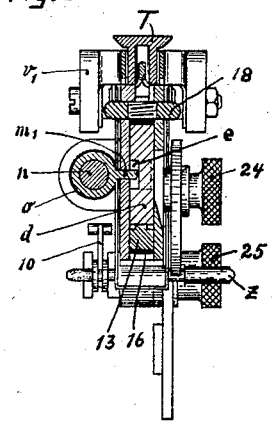
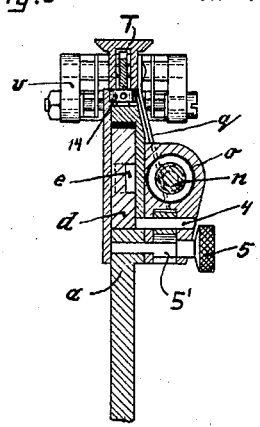
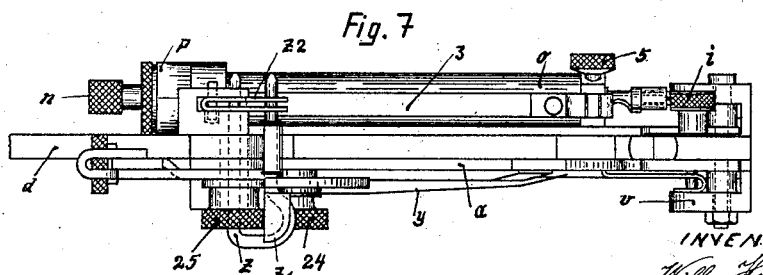

April 1, 1924.                              1,488,984
W. HEYNE
SLIDING CALIPER
Filed Aug. 16, 1922         5 Sheets-Sheet 3
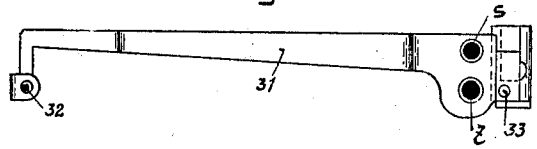
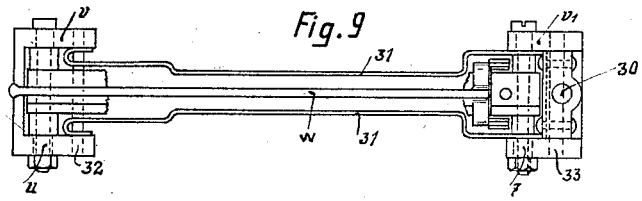
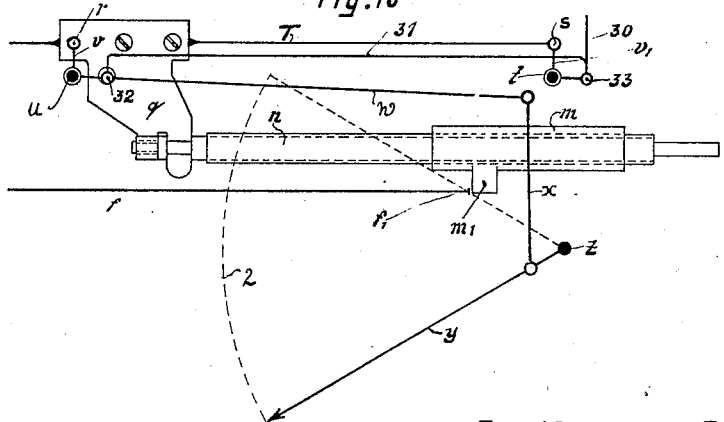
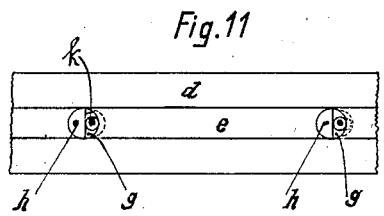
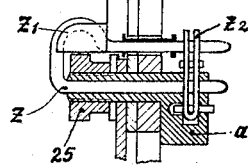
INVENTOR:
Willy Heyne
Wm Wallace White
ATTY.

April 1, 1924. 1,488,984
W. HEYNE
SLIDING CALIPER
Filed Aug. 16, 1922   5 Sheets-Sheet 4

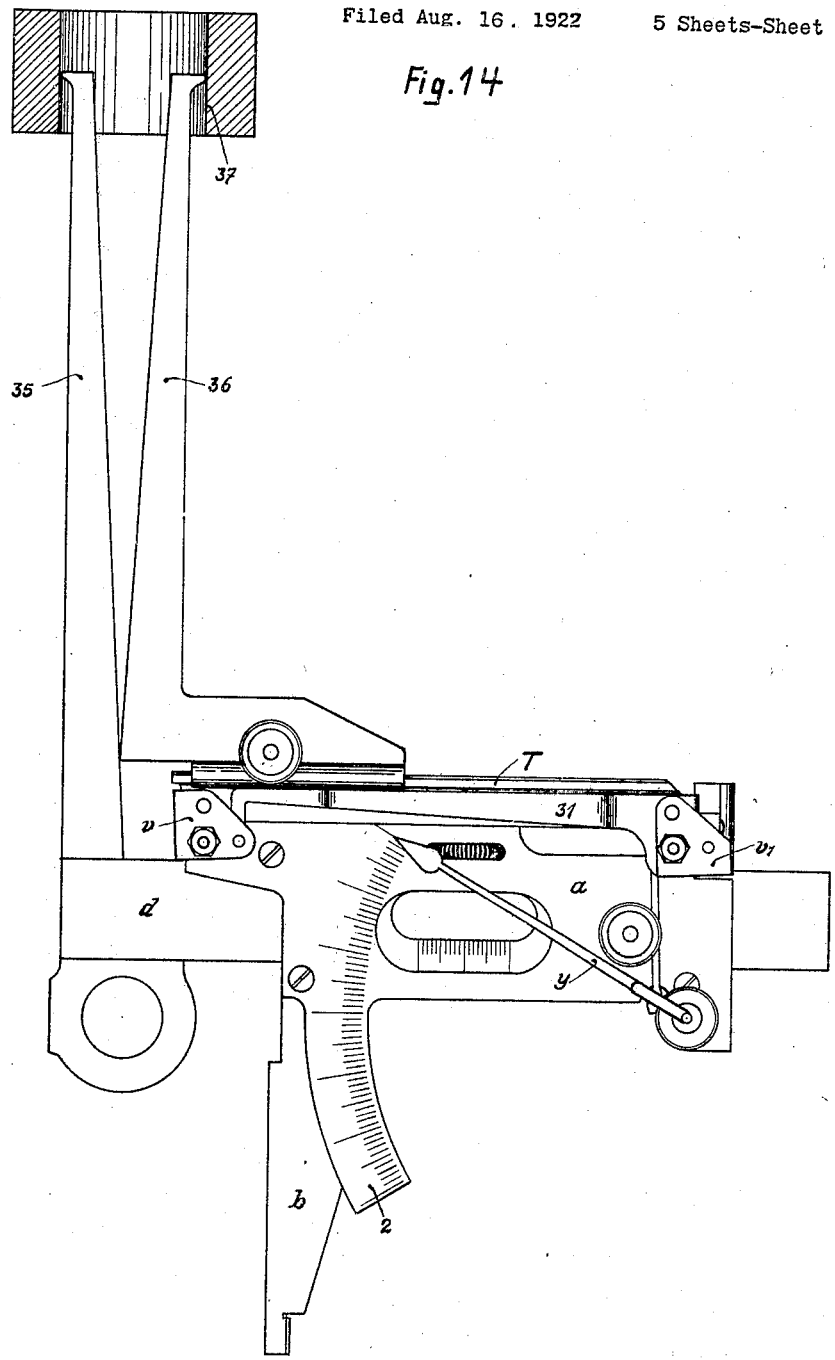

Patented Apr. 1, 1924.

1,488,984

UNITED STATES PATENT OFFICE.

WILLY HEYNE, OF COLOGNE, GERMANY.

SLIDING CALIPER.

Application filed August 16, 1922. Serial No. 582,177.

*To all whom it may concern:*

Be it known that I, WILLY HEYNE, a citizen of Germany, and a resident of Cologne, Germany, have invented a new and useful Improvement in a Sliding Caliper, of which the following is a full, clear, and exact specification, reference being had therein to the accompanying drawing.

This invention relates to calipers and more particularly to a sliding caliper which is so designed that it may be used for a multiplicity of useful purposes and when used as a caliper, affords more accurate measuring facilities.

Sliding calipers heretofore in use so far as I am aware, measure the size of the object placed between their jaws by showing the measurements on a scale or the like on one of the jaw arms and by the use of a nonius accuracy as high as 1/20 mm. may be obtained. In many instances, however, it is found that finer measurements are required, and it is the object of this invention to accomplish such finer measurements after the object to be treated has reached approximately the desired size. In other words, my caliper is used in the ordinary manner until the object has approximately reached the required size, after which a "feeling" contact is brought into operation so that measurement of the object may be obtained to an exactness of 1/100 mm. This is accomplished by means of a special scale and an indicating hand operable by the motion of one of the jaws of the caliper.

For this purpose, according to the present invention, a caliper device adjustable with a high degree of accuracy to the final measurements is placed between the rigid and the movable part of the sliding caliper, the stops of the said caliper device not yet touching so long as the jaws of the sliding caliper are farther apart from each other than the proper measurement. As soon as the jaws of the sliding caliper approximately reach the final distance to be measured, the stops come into contact with each other and impart motion to the indicating hand, which shows on the special scale the difference in size of the object to be measured with respect to the proper measurement to an accuracy of 1/100 mm.

It is accordingly essential that the above mentioned caliper device itself does not come into contact at all with the object to be measured as has already been proposed for other kinds of measuring tools. The advantage of this invention is that the sliding gauge can first be used in its ordinary manner, and that the enhanced measuring accuracy of the caliper contact is used only when necessary, that is, when the article has reached approximately the desired size.

In describing this invention, reference may be had to the accompanying drawings, forming part of this specification, and showing the preferred form of my invention and wherein like numerals refer to corresponding parts throughout the same.

In the drawings,

Figure 1 is a side elevation of the caliper.

Figure 2 is the same view with the cover removed and partially in section.

Figure 3 is a section on the line A—A of Fig. 1.

Figure 4 is a rear view of Fig. 1.

Figure 5 is a section on the line B—B of Fig. 4.

Figure 6 is a section on the line C—C of Fig. 4.

Figure 7 is a bottom view of Fig. 4.

Figures 8 and 9 are the lateral and overhead detailed views of the connecting levers of the hand operating mechanism.

Figure 10 is a diagrammatic view of the complete hand operating connections.

Figure 11 is a rear view of a portion of the sliding shaft $d$.

Figure 12 is a section on the line F—F of Fig. 1.

Figure 14 illustrates the use of the measuring implement as in inside caliper.

Figure 13:
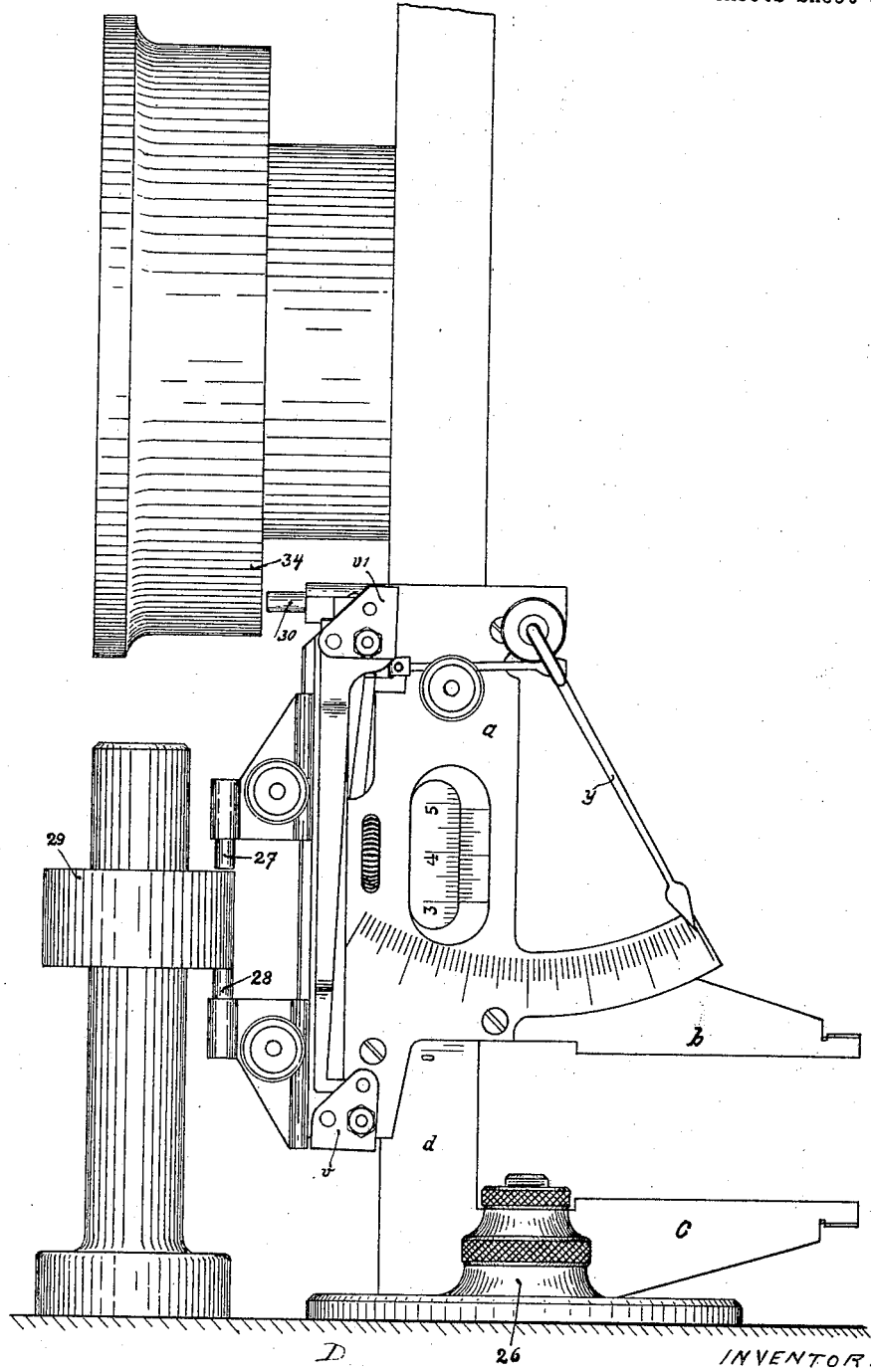
Figure 13 illustrates an application of the measuring tool to a drawing board D.

Entering now into a more detailed discussion of my invention, the rigid body $a$ of the caliper is provided with a stationary jaw $b$ and slidably supports a shaft $d$ therein, having at one end the jaw $c$ which forms the sliding jaw of the caliper. In order to bring into operation the more highly accurate measuring mechanism, the shaft $d$ is provided on its rear face with a shallow longitudinal groove $e$. At predetermined intervals throughout the length of the groove $e$ are depressions or recesses $g$, one wall of which is undercut. For the sake of clearness, it may be supposed that these recesses $g$ are spaced apart 50 mm. In the groove $e$ a variable stop $f$ is located and comprises an elongated strip, the front end $f'$ of which is the active edge of the stop. In order to set the stop $f$ in any desired position, I provide means for detachably securing the same in the groove $e$. This means comprises a projection $h$ on the stop $f$ which is adapted to seat in one of the depressions $g$ and a foot $k$ carried by the turning button $i$, on the shaft $d$, is adapted to be rotated so as to bring the foot into engagement with the undercut portion of the wall of the depression $g$ and securely lock the stop in its adjusted position.

On the rear face of the rigid body $a$ is provided a micrometer screw $m$ rotatably mounted in the tube $o$, and carried by the micrometer screw and movable longitudinally thereon by means of screw threads is a stop $m$ having the projection $m'$ thereon. In order to facilitate setting of the stop $m$, the turning button $p$ of the screw is provided with a scale (see Fig. 4). Thus it will be seen that by turning the button $p$, the stop $m$ and projection $m'$ may be set to any place within the limits of two of the depressions $g$, or in other words, 50 mm. at the most in the present case so that although the stop $f$ can only be adjusted to full distance of 50 mm., the stop $m$ can be adjusted to any desired distance between the depressions $g$. The projection $m'$ on the stop $m$ projects into the groove $e$ so that as the jaws of the caliper approach each other, these members contact. Accordingly, if the dimension of the object being treated is to be 60 mm., the stop $f$ is set to 50 mm. and the stop $m$ is set to 10 mm., by means of the micrometer screw so that when the jaws $b$ and $c$ are shifted toward each other, the stops will contact as shown in Figure 3 at the exact distance of 60 mm. It is to be noted that the micrometer screw $m$ is so mounted in suitable bearings, that limited longitudinal motion is allowed as shown at $n'$, Fig. 3. By permitting this longitudinal motion of this screw, the stop $m$ and projection $m'$ can deflect 3/10 mm. in both directions, that is, 6/10 mm. altogether. Thus, when the projection $m'$ and the edge $f'$ of the stop contact as described, and deflect the micrometer screw 3/10 mm. in either direction, this motion is transmitted to a hand indicating mechanism by suitable link connection. The hand mechanism indicating to an exactness of 1/100 mm. the difference in size between the object and the final measurement. A plan of the connections for transmitting the motion from the micrometer screw to the hand is shown in Fig. 10 and comprises a caliper fence T having a channel on its lower face and carried at the top of the rigid frame $a$ by means of angle brackets $v$ and $v'$ (see Figs. 1 and 4). These angle brackets turn about the stationary pivots $u$ and $t$, the caliper fence T being pivotally connected to the brackets by the bolts $r$ and $s$. Rigidly secured to the fence is a downwardly projecting member $q$ which has its lower end attached to the screw $m$ so that deflection of the screw moves the caliper fence T longitudinally owing to its pivotal connection with the angle brackets $v$ and $v'$. In moving longitudinally the caliper fence T causes the angle brackets $v$ and $v'$ to turn about their pivots $t$ and $u$, and this turning movement of the angle brackets, raises and lowers a coupling rod 31, which is also secured to the angle brackets $v$ and $v'$ but at the points 32 and 33. This motion of the coupling rod 31 is in turn transmitted to the indicating hand $y$ by means of a lever $w$ which is pivotally secured to the angle bracket $v$ at the point $u$ and normally lies within the channel formed in the caliper fence T. This lever $w$ is connected intermediate its ends with one end of the coupling rod 31 so that motion of the rod 31 upwardly and downwardly imparts to the lever $w$, a swinging movement about the pivot $u$. The other end of the lever $w$ is secured to a coupling rod $x$ which is attached to the hand $y$, so that the hand is caused to swing across a suitable scale 2 upon deflection of the micrometer screw caused by the contact between the projection $m'$ and the edge $f'$ of the variable stop. It is to be noted that the pivot points $r$, $s$, $t$ and $u$ respectively, are disposed at the four angles of a parallelogram. The hand swinging over the scale 2. which is graduated so that each mark represents 1/100 mm. indicates how many hundredths of a mm. the object to be measured varies from the desired size, the exact dimension being obtained when the hand is in the middle position (Fig. 1).

In order to prevent the hand $y$ from oscillating to and fro in its position of rest before the caliper device has come into operation, it is pressed by a spring into one of its end positions according to the nature of the measuring to be done at the time. For this purpose, a regulator spring 3 (Figure 4) is provided, which is held at its rear extremity in an angle bracket 1, which is pivotally secured at 4 to the rigid body $a$. In order to turn the angle bracket 1, I provide a button 5 (Figures 4 and 6), which catches in a forked notch of the angle bracket 1, and by means of the eccentric part 5', turns the angle bracket to the right or left as desired. The other end of the spring 3 is connected to a rod 10, pivotally mounted in a suitable bearing and this rod 10 is in turn connected to the hand $y$ on the pin $z$. This turning movement is permitted since it is to be noted that the rod 10 is secured to the hand $y$ in advance of its pivot point which is at $z$ and consequently the spring 3 tends to pull the hand in one position or another according to the movement imparted to the button 5.

In measuring thicknesses such as is usually performed by the jaws $b$ and $c$, the regulator spring is so set that the hand $y$ is in its position of rest at 0.3 mm. If then, on repeated treating, and measuring, the object in question, the jaws $b$ and $c$ gradually approach each other, the hand will begin to move as soon as the object only has to be reduced 0.3. In these last 0.3 mm. the thickness of the object to be measured is shown by the hand to an exactness of 1/100 mm.

It is understood, of course, that before the accurate measuring device comprising the hand $y$ is used for measuring thicknesses as exact as 1/100 mm., the result of the ordinary measuring is first shown to an exactness of 1/20 mm. by means of the nonius 11 (Fig. 1), on the scale of the sliding shaft $d$ visible in the window $d'$.

It is evident that the accurate measuring by means of the hand $y$ is only reliable when the moving of the shaft $d$ inside of the rigid part $a$ of the sliding caliper is as accurate as possible and does not lose its accuracy because of constant use. In order to protect the shaft from wear, which has heretofore been a constant objection, I provide two sliding pieces 12 and 13 in the rigid part of the sliding caliper above and below the shaft (Fig. 2). The sliding piece 12, near one of its ends, can be made to approach the sliding shaft by tightening a screw 14, and at its other end by tightening the screw 15 which will prevent objectionable play of the sliding shaft $d$. The sliding piece 13 is of cross section as shown in Fig. 5 according to which it bears against the lower edge of the shaft $d$ in a middle strip whereas at both sides the sliding path of the shaft is not touched when it is shifted. Below the sliding piece 13 is mounted a spring 16, which constantly urges the sliding piece 13 upward against the shaft $d$. In ordinary use, therefore, when the shaft $d$ slides backward and forward in the rigid part $a$ of the sliding caliper, the lateral longitudinal edges of its lower surface do not come in contact with the resting surface 17 (Fig. 2) and accordingly cannot wear. Now, if the shaft $d$ is set tightly by means of the thumb screw 18, the above mentioned longitudinal edges come into contact with the resting surface 17. By this means the absolute accuracy and exactness of the shaft edges necessary for measuring are fully maintained, while at the same time, means are provided whereby the edges may be brought together for the purpose of insuring accurate measuring.

It has been quite common heretofore, to construct sliding calipers with means for measuring angles, but in my invention, these angles may be measured with a greater degree of accuracy, because of the fact that the same sector scale 2 on which the hand $y$ plays can also be used for the purpose of measuring the angle. In order to accomplish this, I provide a clamp 22 pivoted on the axle $z$ of the hand, and provided with a screw 23 by means of which angle squares 20 and 21 (Figs. 1 and 4) may be securely held in place. The clamp 22 is provided with an arm 24 at the end of which is a nonius which plays on the sector scale 2. By clamping either of the squares 20 or 21 in the clamp 22, Figs. 1 and 4 all angles up to 180° can be measured by means of the nonius 13, since the square 20 has an angle of 90° and the square 21 an angle of 135°. After the clamp 22 has been rotated about the axle $z$, to measure the angle desired, it may be held in place by means of the screw 25, which may be tightened to lock the clamp in its adjusted position. The screw 25 is carried by the axle $z$ as shown in cross section in Fig. 12. This cross section is also shown in Fig. 7 and illustrates the construction of the axle $z$ which is carried out in front of the rigid body and is provided with a return bend $z'$. The rear ends of the members $z$ and $z'$ are connected together by means of fixed joints $z^2$.

According to the foregoing description, the sliding caliper can be used for a multiplicity of useful purposes in view of the construction of the caliper fence T. For instance in Fig. 13, the sliding caliper is shown as used on a drawing board by being connected to a foot 26 which is believed to be of well known construction and hence does not need description. However, in view of the accurate measuring which can be accomplished by the present invention, it is always possible to control the objects treated to an exactness of 1/100 mm. In Fig. 13 which shows the caliper used on the drawing board, feeling pins 27 and 28 can be attached to the caliper fence T. These feeling pins comprise clamping jaws adapted to engage the caliper fence and are capable of sliding adjustment thereon. In order to hold the feeling pins in their adjusted position, a locking screw is provided for tightening the clamping jaws against the sides of the caliper fence. Fig. 13 further shows the use of a feeling pin 30 which is perpendicular to the caliper fence T and which is secured therein by means inserting one end thereof in the opening 30' provided for that purpose (see Fig. 9). This feeling pin 30 as shown by Fig. 10, is attached to the coupling rod 31, connecting it to angle brackets $v$ and $v'$ of the joint parallelogram. The points 32 and 33 in which this coupling rod connects with the angle brackets are exactly equally distant from the rigid pivot points $u$ and $t$. In this way, a second parallelogram is produced which is linked to the first and whereby the coupling rod 31 is always exactly parallel to the caliper fence T, so that the movement of the feeling pin 30 is at all times perpendicular to the caliper fence T. The arrangement of the coupling rod 31 is clearly shown in Fig. 9 and it is to be noted that the bolts s and t pass through the above mentioned coupling rod without touching the same, since the openings in the coupling rod through which the bolts s and t pass are larger in diameter than the said bolts. Therefore, in view of the fact that the feeling pin 30 works in cooperation with the caliper fence T, which is in turn connected to the hand y, any inaccuracy amounting to 1/100 mm. is immediately indicated by means of the hand y. It is also to be noted that by means of this arrangement, articles may be inspected on a drawing board and vertical as well as lateral measurements taken with the same degree of accuracy.

In Fig. 14, I have illustrated the sliding caliper as described herein in use as an inside caliper. In using my invention for this purpose, the movable jaw c is removed and in its place a point 35 is placed on the sliding shaft d and the other point 36 is attached to the caliper fence T by means of a clamping arrangement similar to the clamping arrangement of the feeling pins described above, and it is to be seen that the size of a boring 37 can be controlled with regard to its accuracy up to 1/100 mm. since the caliper fence T and the hand y connected therewith, are also employed in this use of the instrument.

It is readily seen therefore, that the instrument described herein may be readily used for all kinds of accurate work and particularly for such work in which the last stages require extremely accurate measuring, which during the early stages was not necessary and although this invention has been illustrated quite specifically it is to be understood that minor changes as to the details of construction can be resorted to without departure from the spirit of the invention as defined in the claims hereto appended.

Having now more fully described and ascertained the nature of my invention and in what manner the same is to be performed, I declare that what I claim is:

1. In a sliding caliper, a frame provided with a jaw, a slidable jaw within the frame, a stop on the slidable jaw, and a stop adjustably carried by the frame and means operable upon contact of the stops after the predetermined point has been reached by the sliding jaw to indicate the difference between the proper and the actual size of the work.

2. In a sliding caliper, a frame provided with a rigid jaw, a cooperating jaw slidable within the frame, a micrometer screw on the frame and an indicating hand connected to and operable by the micrometer screw, a stop on the screw, and a variable stop on the sliding jaw contacting with the stop on the micrometer screw to operate the indicating hand when the jaws approach each other to a distance less than the distance to which the micrometer screw has been set.

3. In a sliding caliper, a frame provided with a rigid jaw, a cooperating jaw slidable within the frame and having a longitudinal groove therein and recesses communicating therewith, a variable stop within the groove, means engaging the said recesses to lock the stop in position, a micrometer screw on the frame having a projection thereon adapted to contact with the variable stop, a longitudinally movable caliper fence carried by the frame and connected to the micrometer screw, and an indicating hand connected to and operable upon movement of the micrometer screw and caliper fence to indicate the difference between the proper and the actual measurement of the work.

4. In a sliding caliper, a frame provided with a rigid jaw, a cooperating jaw slidable within the frame, a variable stop on the sliding jaw, a micrometer screw on the frame having a projection adapted to contact with the variable stop, a caliper fence connected to the micrometer screw and movable longitudinally by the adjustment of the micrometer screw, an indicating hand pivoted to the frame and connected to the micrometer screw and operable upon movement of the caliper fence to indicate the difference between the proper and the actual size of the work and adjustable resilient means for normally holding the indicating hand in its upper or lower end positions.

5. In a sliding caliper, a frame provided with a rigid jaw, a cooperating jaw slidable on the frame, a strip above the slidable jaw adjustable relative thereto to prevent lateral movement thereof, a second strip below the said jaw comprising a central rib contacting with the central portion of the lower face of the jaw, means for adjusting the jaws and a spring normally urging the rib of the said lower strip against the lower face of the sliding jaw to raise the same out of contact with the frame to eliminate wear.

In testimony whereof I have signed my name in the presence of two witnesses.

WILLY HEYNE.

Witnesses:
 HENRY W. HAN,
 ERIC ROVSDEY.